United States Patent [19]

Davison

[11] Patent Number: 4,996,830
[45] Date of Patent: Mar. 5, 1991

[54] VEHICLE-MOUNTED BRUSH CUTTER

[76] Inventor: Timothy A. Davison, 12100 203rd Ave., SE., Monroe, Wash. 98272

[21] Appl. No.: 444,325

[22] Filed: Dec. 1, 1989

[51] Int. Cl.[5] .............................................. A01D 34/06
[52] U.S. Cl. ....................................... 56/14.7; 56/15.2; 56/15.5
[58] Field of Search ...................... 56/16.7, 17.1, 17.5, 56/DIG. 16, 14.7, 14.9, 15.1, 15.2, 15.5, 15.6

[56] References Cited

U.S. PATENT DOCUMENTS

| 3,949,539 | 4/1976 | Cartner | 56/15.5 X |
| 4,502,269 | 3/1985 | Cartner | 56/15.6 X |
| 4,869,056 | 9/1989 | Lynch | 56/15.5 X |
| 4,887,417 | 12/1989 | Parsons, Jr. | 56/15.2 |

Primary Examiner—Thuy M. Bui
Attorney, Agent, or Firm—Harry M. Cross, Jr.

[57] ABSTRACT

A highly mobile brush cutting vehicle is adapted to mount a rotary steel disk-type cutter head on the end of an elongated boom assembly. The vehicle is preferably rubber-tired, with individual wheels mounted on articulating legs. The wheel legs are preferably mounted to the vehicle undercarriage for independent articulation up and down. The preferred brush cutter includes a boom assembly provided with a telescoping extension to which the cutter assembly is mounted. The brush cutter assembly itself is preferably provided as integral part of an excavator bucket that includes a jaw or clamp arm.

15 Claims, 7 Drawing Sheets

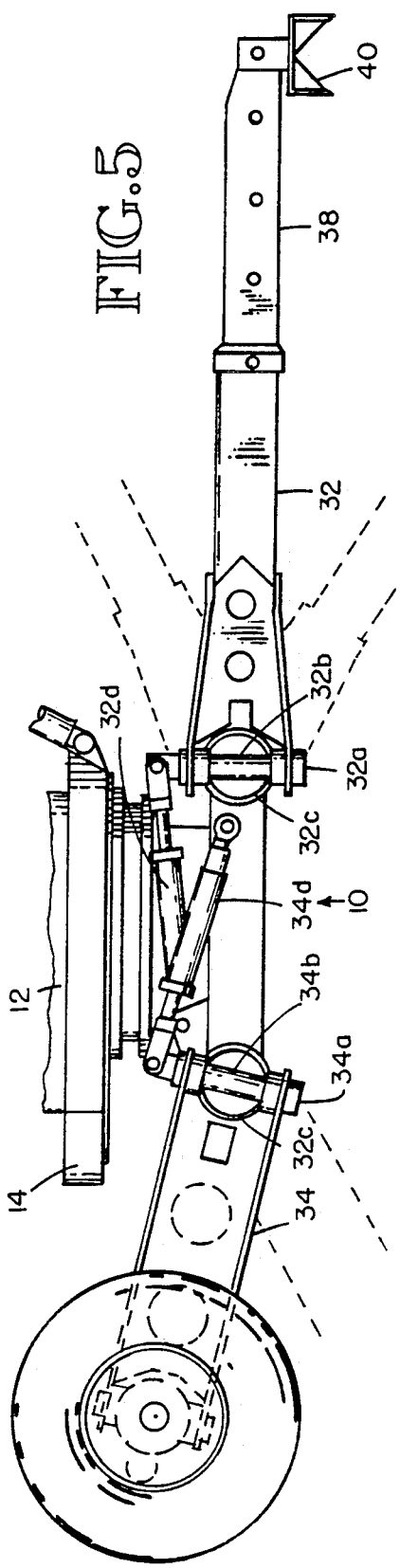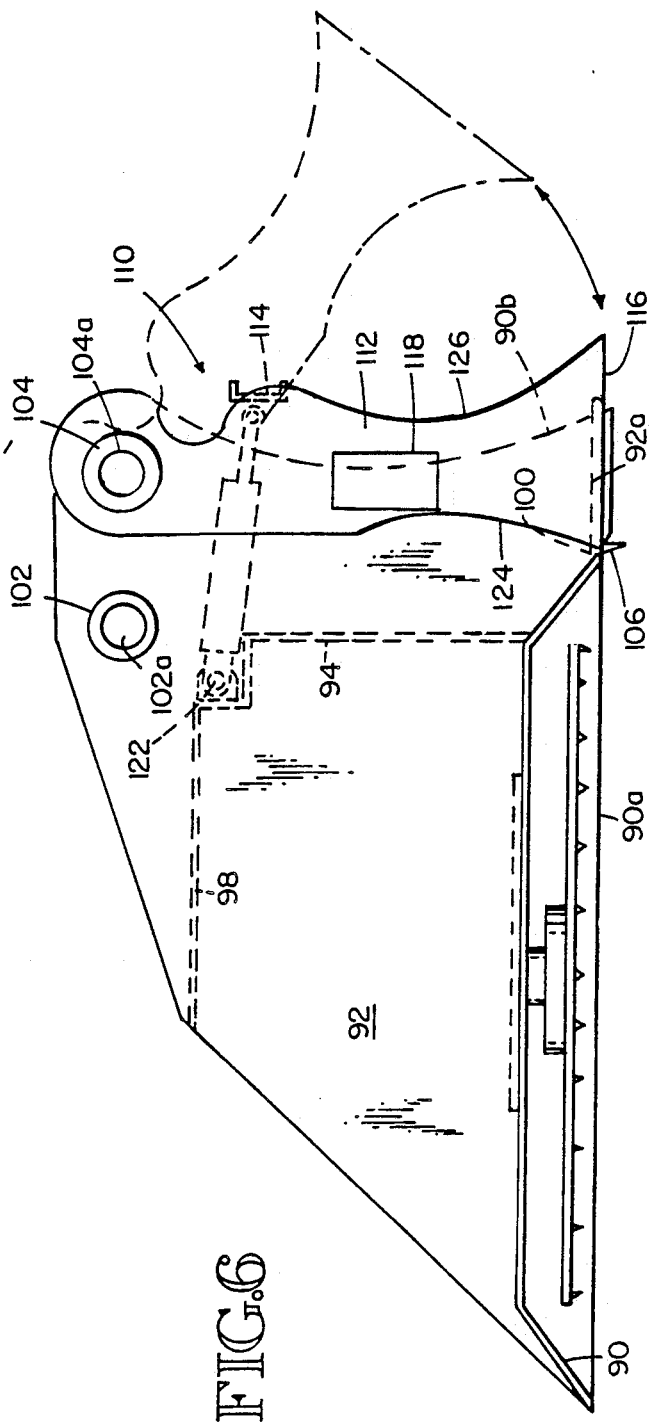

VEHICLE-MOUNTED BRUSH CUTTER

FIELD OF THE INVENTION

This invention relates to heavy duty brush cutting machinery and particularly to vehicle-mounted brush cutters.

BACKGROUND OF THE INVENTION

Heavy duty, commercial brush cutters have been used in connection with forestry management, right-of-way clearing and maintainance, and for similar purposes. These brush cutters typically employ heavy steel rotary circular blades that are mounted on tracked or rubber-tired vehicles by means of a boom or boom combination. The brush cutter blade is typically powered hydraulically and controlled from an operator's cab on the vehicle. An exemplary prior art blade may be six feet in diameter, weigh several hundred pounds, and contain upper and lower cutting teeth. Such a blade can thus cut brush from its upper and lower surfaces as well as its perhiphery. The momentum built up by a cutter blade of this size and the forces imposed on its supporting structure are substantial. Therefore, a substantial mounting assembly is required to handle the weight and kinetic energy forces present in the operation of such a brush cutter at the end of a boom. The resulting structure often has inhibited mobility and therefore limited application.

For example, in power line right-of-way maintainance, the brush cutter must be capable of traversing rugged terrain and negotiate around stumps and rocks without damage to the cutter assembly or its mounting assembly. For such uses, a highly mobile vehicle is required. Moreover, it is often desireable that the mobile brush cutter have some digging, scraping or earth moving capacity, in addition to its brush cutting capacity, to adequately clear or maintain right-of-way conditions.

SUMMARY OF THE INVENTION

A primary object of the present invention is to provide a highly mobile brush cutting vehicle adapted to mount a rotary steel disk-type cutter head on the end of an elongated boom assembly. The vehicle of this invention is preferably rubber tired, with individual wheels mounted on articulating legs. The wheel legs are preferably mounted to the vehicle undercarriage for independent articulation up and down. The preferred brush cutter includes a boom assembly provided with a telescoping extension to which the cutter assembly is mounted. The brush cutter assembly itself is preferably provided as an integral part of an excavator bucket that includes a jaw or clamp arm.

This an other objects and advantages of the brush cutter of this invention will become apparent from the following detailed description of the invention.

BRIEF DESCRIPTION OF THE DRAWINGS

FIG. 5 is a side elevation view of the undercarriage;

FIG. 6 is a side elevation view of another brush cutter assembly provided as an integral part of an excavator bucket that includes a bucket jaw;

DETAILED DESCRIPTION OF THE INVENTION

Figure 2:
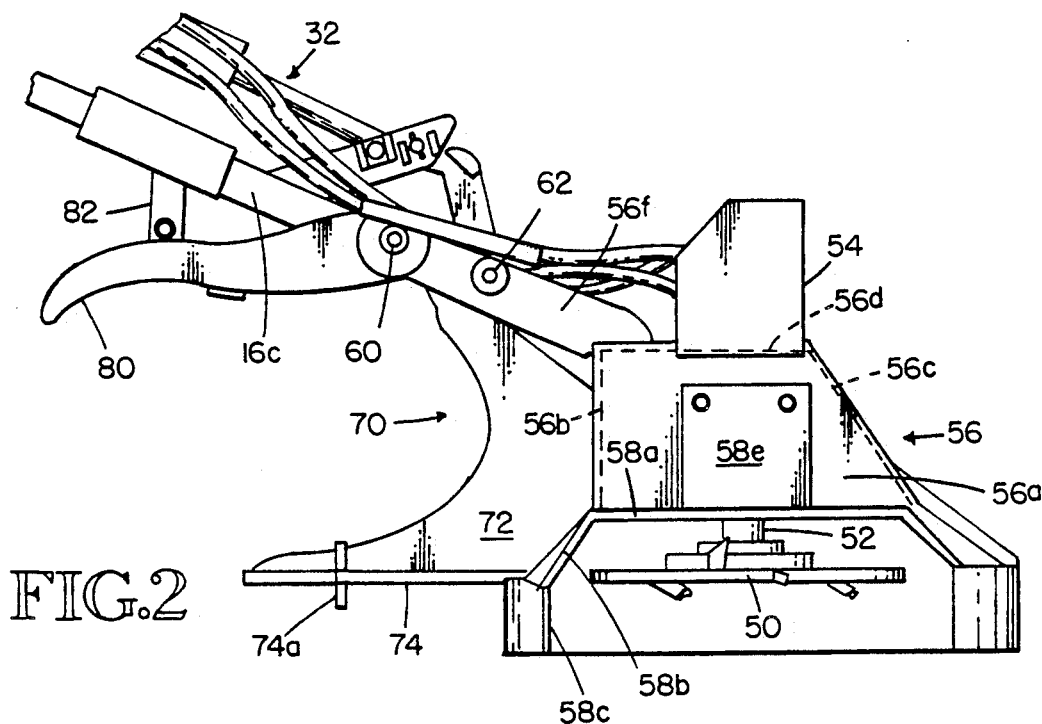
FIG. 2 is a close-up side elevation view of the brush cutter assembly provided as an integral part of an excavator bucket that includes a clamp arm.

As shown in FIGS. 1, 4, 5 and 7, the preferred brush cutter system of this invention comprises a rubber tired undercarriage 10, a cab and engine assembly 12 mounted on a turntable 14 of the undercarriage, a boom combination 16 attached at 18 to the frame of the cab and engine assembly 12 for pivotal movement in a vertical plane, and a brush cutter assembly 20 attached to the outer end of the boom combination at 22 for pivotal movement in a vertical plane. The boom combination 16 is provided as a two piece combination having a main boom 16a and an excavator stick 16b, the latter receiving a longitudinally-telescopic arm 16c to which the brush cutter assembly 20 is attached. Appropriate hydraulic cylinders 24, 28 and 30 control raising and lowering boom members 16a and 16b and the extension and retraction of arm 16c, respectively. A hydraulic cylinder 32 mounted on the telescopic arm 16c pivotally positions the brush cutter assembly 20 through an appropriate in-line pivot linkage 34 pivotally attached to the arm 16c and the brush cutter assembly 20.

The undercarriage 10 is supported by front and rear pairs of legs 32 and 34. Each leg is pivotally mounted at its inner end to the undercarriage for vertical pivotal movement. The leg mounting, 32a for the front and 34a for the rear legs, is joined to the undercarriage so that the leg to which it is attached may pivot horizontally also. In a typical construction, the leg mounting, 32a or 34a, would include a horizontal shaft mounted horizontally to the undercarriage, and a vertical shaft carried by a bearing member rotatably mounted on the horizontal shaft, the leg being mounted to the vertical shaft. This construction would permit the leg to pivot vertically about the horizontal shaft and to pivot horizontally about the vertical shaft. Each leg mounting, 32a or 34a, would also include hydraulic positioning cylinders to position and maintain the position each leg in the desired vertical and horizontal location. With respect to FIG. 5, an exemplary front leg 32 is shown mounted to a vertical shaft 32b and the vertical shaft is shown mounted to a horizontal shaft 32c, the vertical pivot position of the front leg 32 being controlled by hydraulic cylinder 32d. Likewise, FIG. 5 shows an exemplary rear leg 34 mounted to a vertical shaft 34b and the vertical shaft mounted to a horizontal shaft 32c, the vertical pivot position of the rear leg 34 being controlled by hydraulic cylinder 34d. The extent of vertical movement of the front and rear legs is shown in dotted outline. With respect to FIG. 4, the horizontal position of each front leg is controlled by a hydraulic cylinder 32e and the horizontal position of each rear leg is controlled by a hydraulic cylinder 34e. Each rear leg has a steerable hydraulic drive wheel 36 mounted on the outer end of the leg. Each front leg is provided with a longitudinally-telescopic reach arm 38 on the outer end of which a support pad 40 is mounted.

Figure 1:
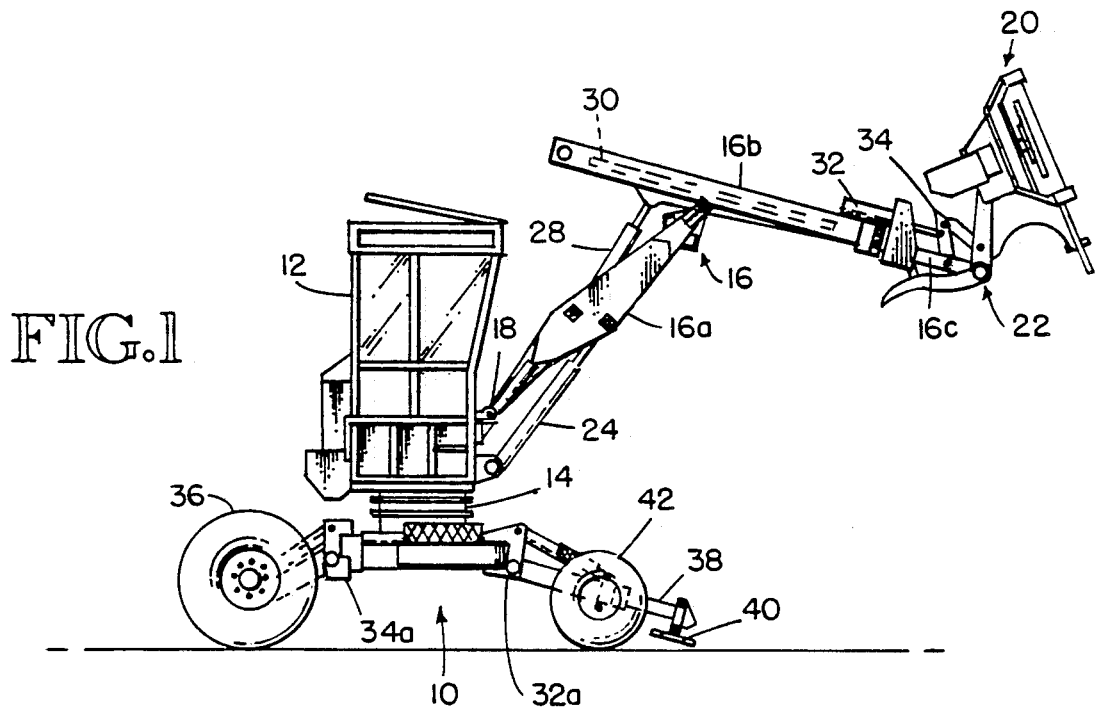
FIG. 1 is a side elevation view of a preferred brush cutter system of this invention.
Figure 4:
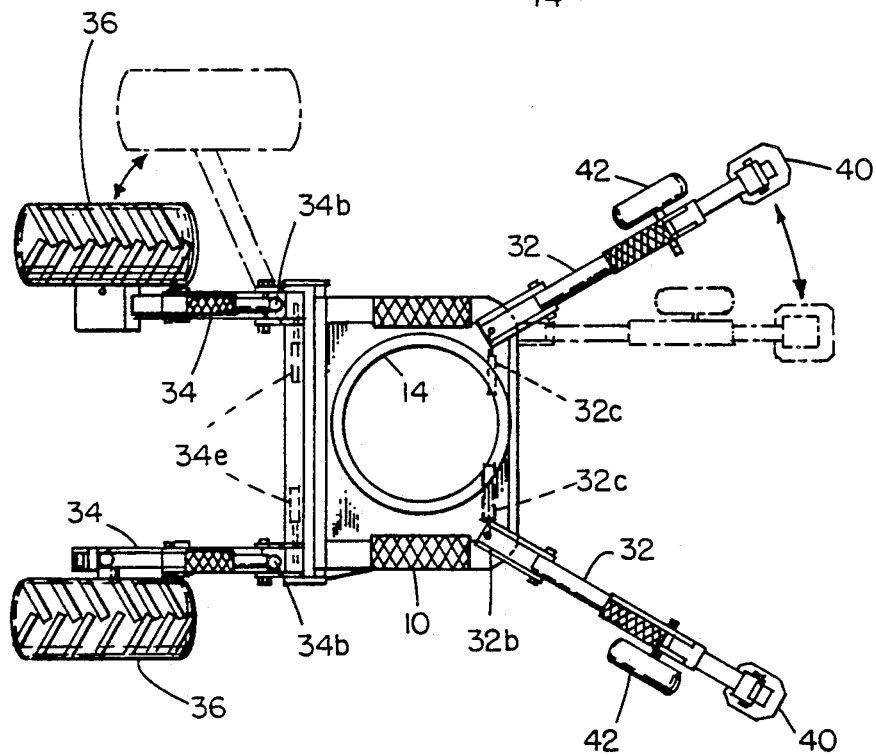
FIG. 4 is a top plan view of the preferred undercarriage for the brush cutter system of this invention.
Figure 7:
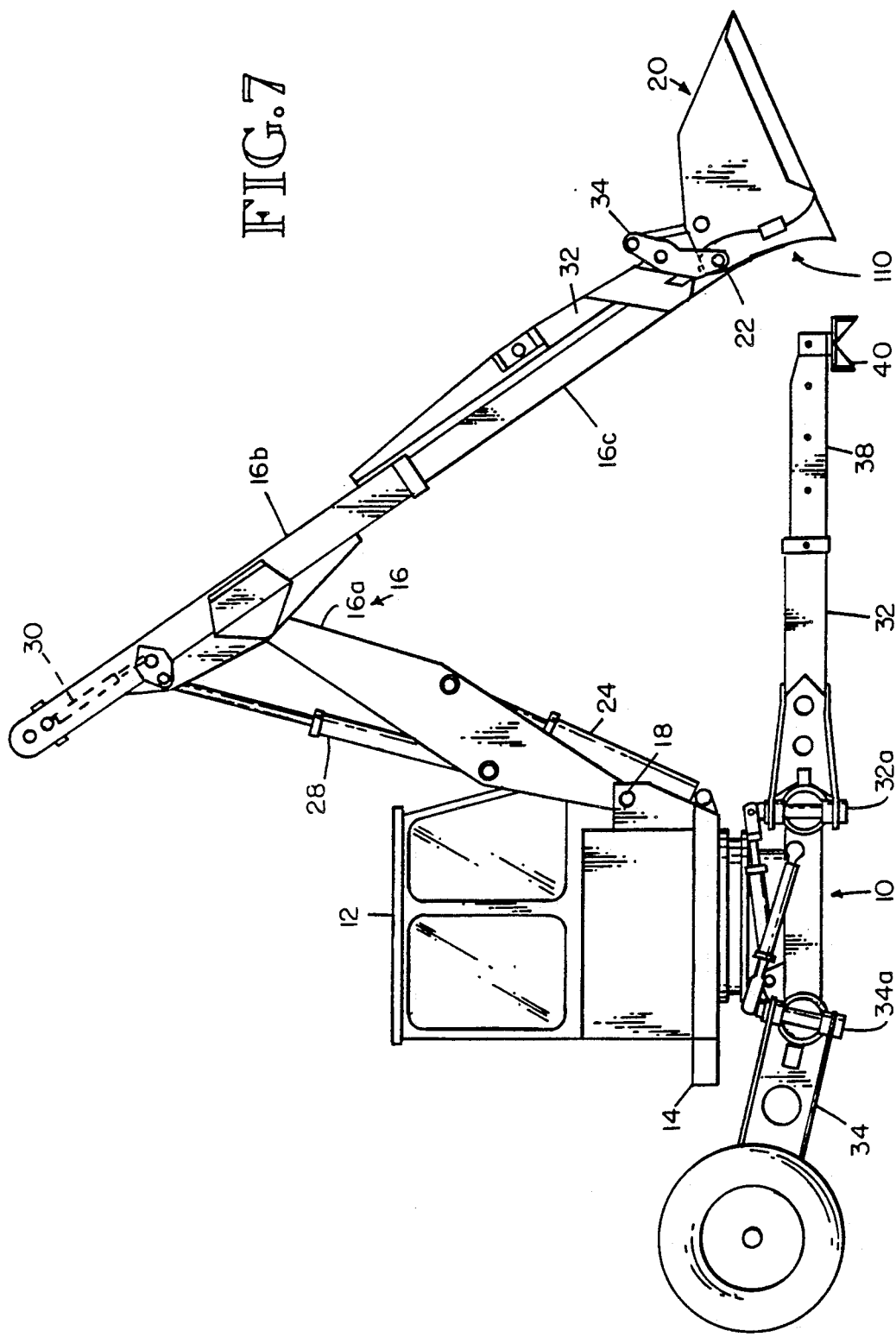
FIG. 7 is a side elevation view of a second embodiment of the brush cutter system of this invention fitted out with the undercarriage of FIG. 5 and the brush cutter asembly of FIG. 6.

As shown in FIGS. 1 and 4, each front leg may also have an idler wheel 42 journal mounted thereon. In a normal operative brush cutting mode, the front legs would be pivoted downward far enough to engage the support pads 40 and lift the idler wheels 44 clear of the ground. The front and rear legs would be spread outward to whatever extent was required for stability. When the vehicle is to be driven and steered under its own power, using the rear drive wheels 36, the front legs would be positioned inward to place the idler wheels parallel to one another and the front legs would be raised to lift the support pads 40 clear and to engage the idler wheels with the ground. If necessary or otherwise desired, the telescopic arms 38 could be retracted longitudinally for transport, also.

Figure 3:
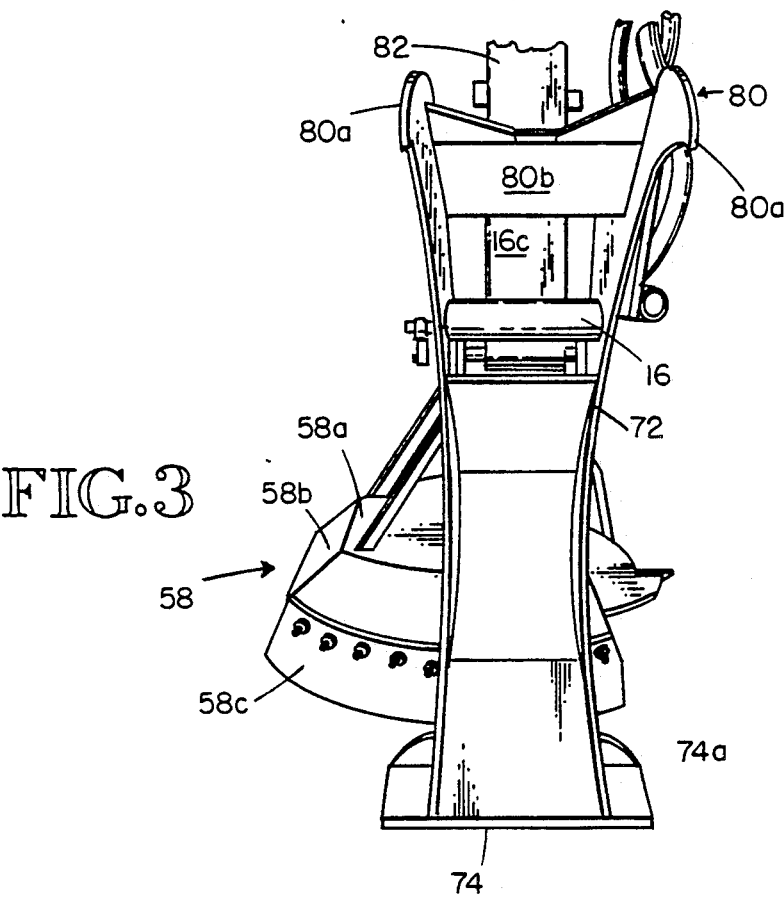
FIG. 3 is a rear elevation view of the FIG. 2 assembly.

The brush cutter assembly 20 shown in FIGS. 1-3 comprises a rotatable circular brush cutter blade disc 50 mounted to a drive shaft 52 that extends from a hydraulic motor assembly 54 downwardly through a support framework 56 and a cutter blade housing 58. The housing 58 is an inverted pan that shrouds the cutter blade; comprising a top circular portion 58a, a downwardly and outwardly extending frustro-conical rim portion 58b, and a replaceable, flexible, circular skirt portion 58c. Part of the pan portions 58a-58c may be cut away as shown in FIG. 1 to expose the cutter blade 50 so that sideways cutting can occur by shifting the cutter assembly sideways into the material to be cut. The support framework 56 comprises a pair of upstanding parallel side plates, of which one—56a—is shown, which are secured to the top of the housing 58, as by welding; a back plate 56b and a front plate 56c extending between the side plates and secured thereto, as by welding; a top plate 56d extending between the side plates and secured thereto for support of the hydraulic motor assembly, as by welding; the top, back and front plates providing an enclosed cavity above the housing pan 58a within which the hydraulic motor assembly and drive shaft may extend in a protected environment; and an access door 56e may be provided for service access into the cavity.

An extension 56f is provided for each of the side plates 56a for mounting the cutter assembly on the end of the boom 16 combination. The end of the boom combination 16 is pivotally connected to the side plate extensions 56f at 60, and the end of the kinematic linkage 34 is pivotally connected to the side plate extensions 56f at 62. Consequently, extension and retraction of the hydraulic cylinder 32 will effect pivotal downward and upward movement of the cutter assembly about the pivot point 60.

Rearwardly of the framework cavity and back plate 56b, an excavator bucket 70 may be provided. This bucket comprises a pair of side plates 72 extending rearwardly of the framework side plates 56a, beneath the side plate extensions 56f, and secured to the side plates 56a and their extensions 56f, as by welding; and a bottom plate 74 secured to the side plates 72, as by welding, and provided with a depending shoe plate or clete 74a. The bucket side plates 72 may be countered along their rearward edges as shown to provide a rearwardly-opening scoop which may be used to grub and excavate. A thumb 80 may be provided by attachment to the framework extensions 56f at pivot point 69 and supported at midlength by support leg 82 depending from boom extension 26c. When the bucket 70 is provided in combination with the thumb 80, an object such as a log can be gripped between the bucket rearward edges and the thumb, and moved out of the way during a brush cutting operation. The thumb itself may comprise a pair of side plates 80a, cross-connected by bracket 80c, and pivotally mounted to pivot point 60 by the same cross shaft 61 that mounts the cutter assembly to the boom combination (see FIG. 3).

FIGS. 6-9 illustrate a preferred form of cutter assembly 20. This embodiment comprises a cutter blade disc housing 90 having an inverted pan configuration, a support framework composed of a pair of side plates 92 welded to the top of the housing 90 such that the side plates are parallel to one another, and back, front and top plates, 94, 96 and 98 respectively; the back and top plates being welded to the side plates 92, and the front plate being bolted to the front edges of the side plates. The side plates are shaped to provide a rear portion that extends behind the housing pan with the rear extension of each side plate having a bottom edge 92a coplanar with the bottom of the housing pan edge 90a. The flexible skirt portion 91 is bolted to the bottom edge of the housing pan and depend therefrom. The rear extension of the side plates, behind the back plate 94, provides a bucket or scoop section which may be employed to grub or scrape during a brush cutting operation. A rear extension bottom plate 100 is welded between the side plates at the bottom edges 92a to provide a bottom wall for the bucket section. The rear extension of each side plate also projects upward and rearward to provide points 102 and 104 of attachment for attaching the cutter assembly to the end of a boom combination 16; attachment point 102 for attachment to the in-line pivot linkage 34 by means of a cross shaft 102a and attachement point 104 for attachment to the end of boom 16c by means of a cross shaft 104a. The upper rearward extension, of each side plate, terminates generally vertically above the terminus of bucket bottom plate 100 and is interconnected thereto by a generally vertically-extending concave back edge 90b.

Figure 8:
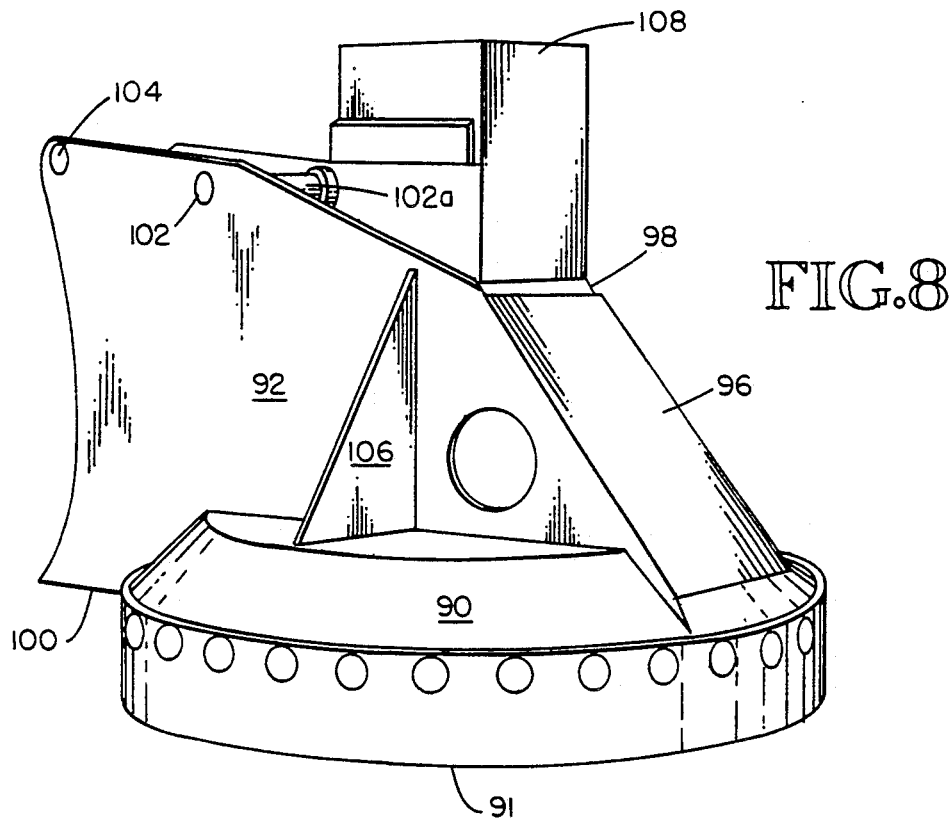
FIG. 8 is a perspective view of the FIG. 6 brush cutter assembly taken from the opposite side.
Figure 9:
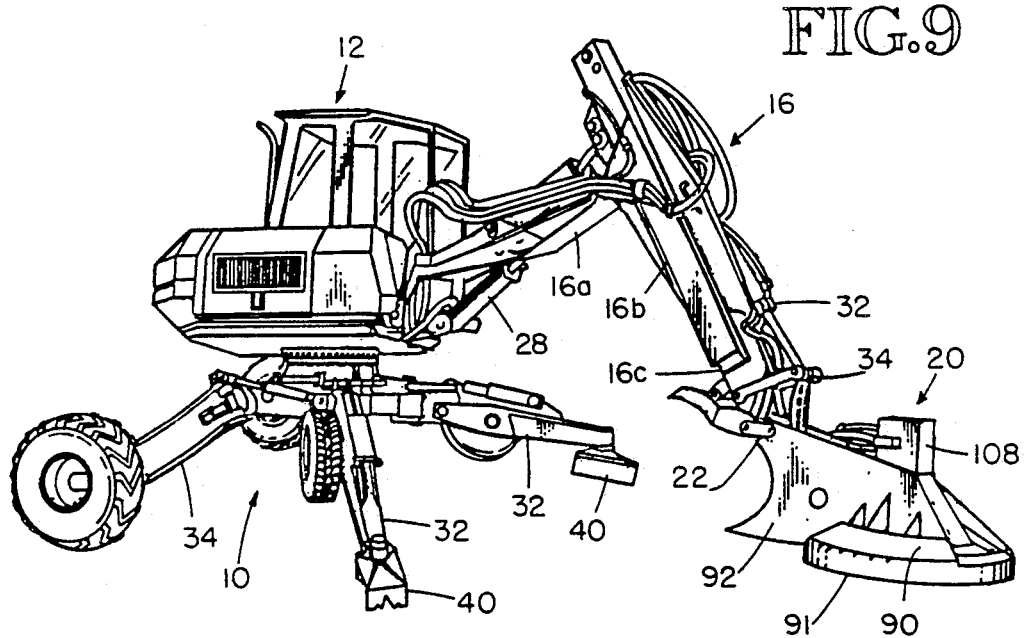
FIG. 9 is a perspective view of the brush cutter system of this invention with the brush cutter assembly of FIG. 8 with a clamp arm.

The housing pan 90 is preferably an integral member, either fabricated from one piece or assembled from a circular top plate, segmented, and a frustro-conical rim plate, also segmented, that are welded together with the weld joint ground to yield a one-piece configuration. One side of the housing pan, including the top portion and the rim portion, has a cut-away segment to expose the cutter disc for side cutting, as shown in FIG. 6. The opposite side of the housing pan, as shown in FIG. 8, is not cut-away and a triangular reinforcing bracket plate 106 is welded to the adjacent side plate 92 and to the circular top portion of the housing pan. A hydraulic motor assembly 108 is mounted on the top plate 98, axially above the cutter disc and connected to the disc by means of a drive shaft that is not shown. The top, back and front plates define a cavity for the hydraulic motor assembly and cutter disc drive shaft to extend; front plate 96 being removable for access into that cavity.

The configuration of the FIG. 6 cutter assembly permits the addition of a bucket jaw 110 without modification of the basic cutter assembly structure. This jaw 110 comprises a pair of side plates 112 which are journal-mounted to the outside of the cross chaft 104 so that the jaw side plates will externally overlap the cutter assembly side plates 92. A cross bracket 114 connects the two jaw side plates, midpoint, for reinforcement and a jaw bottom plate 116 connects the bottom edges of the jaw side plates. The bottom edges of the jaw side plates position the bottom plate 116 at an elevation, when the jaw is closed, below the rear extension bucket bottom plate 100 so that the bucket jaw can overlap the bucket section rear edges 90b. Each jaw side plate may be provided with a midpoint stabilizer plate 118 which overlaps the bucket side plate extensions to prevent the bucket jaw plates from being jammed out of alignment when the bucket jaw is closed to the position shown in FIG. 6. The bucket jaw is operated by a hydraulic cylinder 120 mounted at one end to the reinforcement bracket 114 and to a connection 122 within the bucket cavity between the bucket side plate extensions. The front edges 124 of each bucket side plate are concave frontward, and the back edges 126 of each bucket side plate are concave rearward; thus to provide gripping edges 124 to cooperate with the bucket rearward edges 90b, and to provide cutting or scraping edges 126 to enable the jaw to function as a digging or scraping element when closed. The cooperating edges 90b and 124 provide a grapple configuration for gripping and lifting an object such as a log that tends to position the object upward within the bite of the jaw. A clete 106 may be provided on the bottom of the bucket bottom plate 100 to serve the additional function of a closure stop for the jaw; the forward edge of the jaw bottom plate 116 contacting the clete to prevent an over-closure action that might jam and lock the jaw closed.

Figure 10:
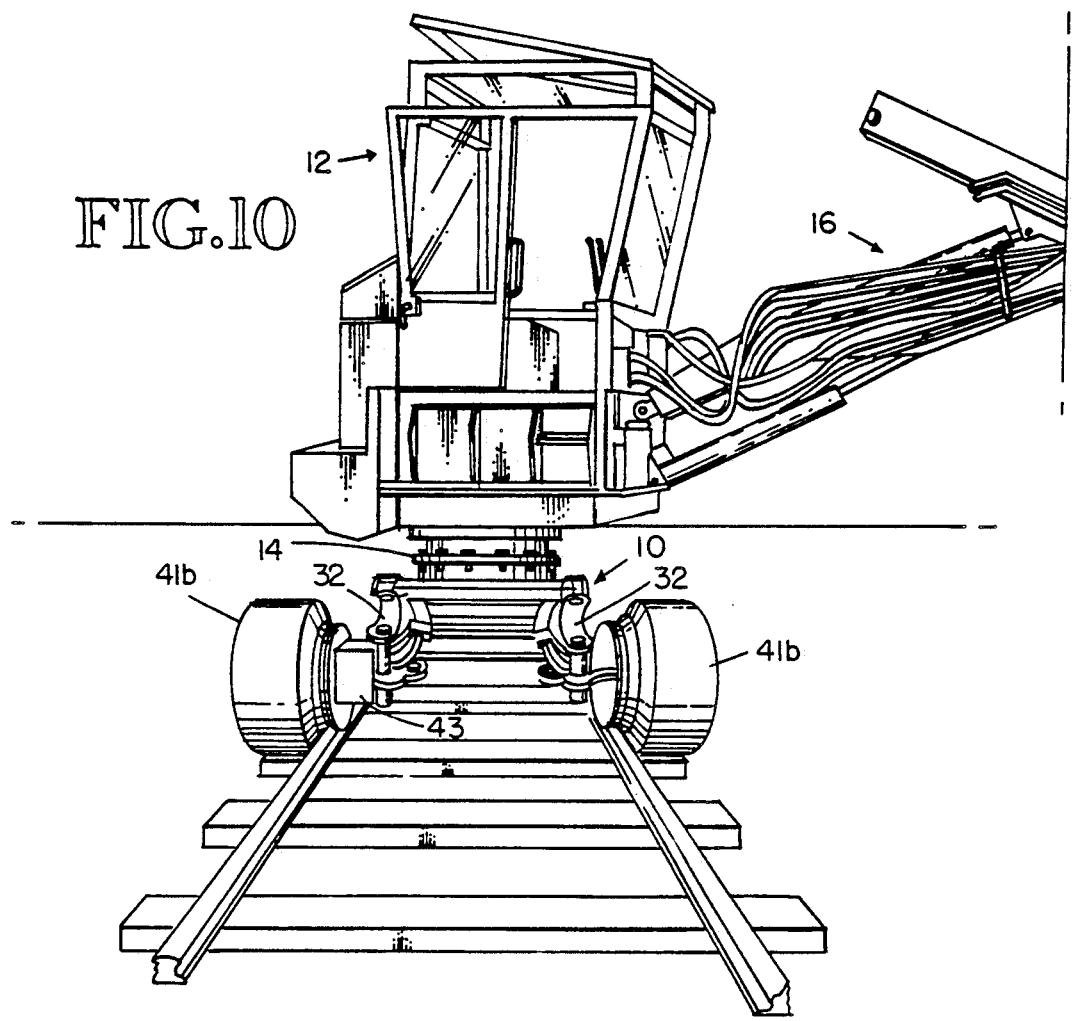
FIG. 10 is a perspective view of the brush cutter system of this invention modified to travel on a railway track.
Figure 11:
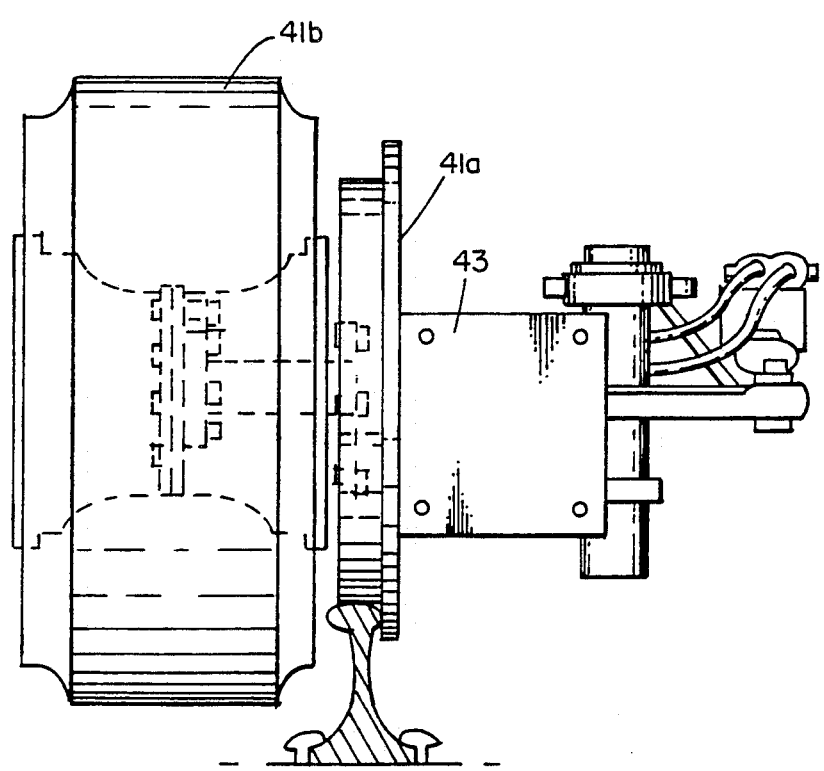
FIG. 11 is a detailed elevation view of the railway track wheel modification of the FIG. 10 embodiment.

The FIGS. 10–11 embodiment illustrate a modified undercarriage structure 10 wherein the forward and rearward pairs of legs are provided with flanged steel railway wheels 41a and outward thereof rubber tired wheels 41b. At least one wheel in each pair is powered by an individual hydraulic motor 43. The rubber tired wheels have a diameter slightly larger that the rail wheels so that the machine may travel to and from a rail site and mount and dismount the rails. Such a machine would have unique utility as a railway right-of-way clearing machine.

Figure 12:
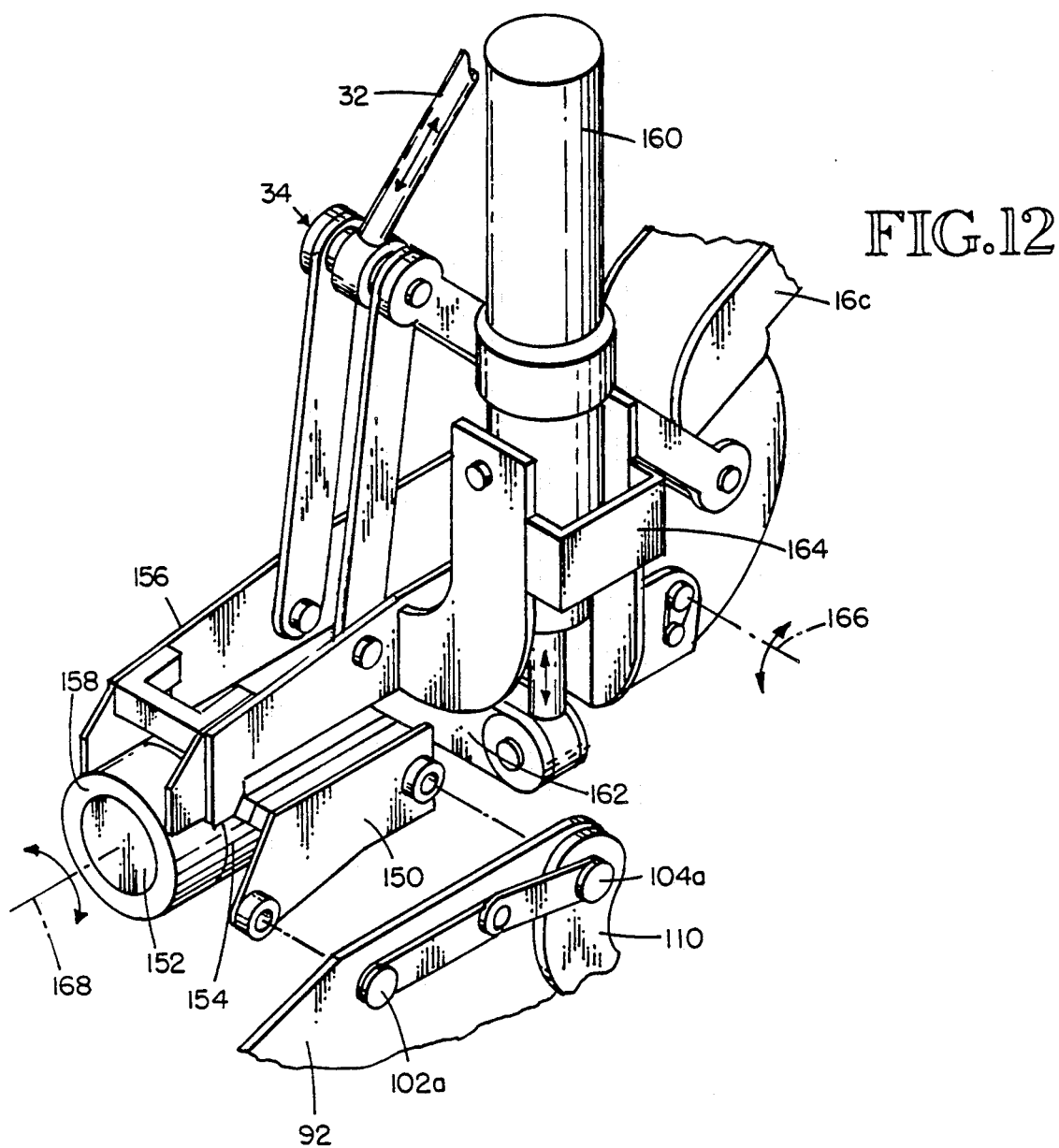
FIG. 12 is a perspective view of a side-angling assembly adapted to pivot the brush cutter assembly of FIG. 6 from side to side.

FIG. 12 illustrates a side angler assembly which may be positioned between the end of the telescopic boom segment 16c and the brush cutter assembly. This assembly is designed to mount to a brush cutter assembly of the FIGS. 6 and 8 configuration, of which side plate 82 is shown in this view. This assembly comprises a mounting saddle plate 150 that spans the width between the cutter assembly mounting plates 92 and is pinned thereto through shaft holes 102 and 104 (see FIG. 8) in place of the cross shafts such as 102a of FIG. 8. Saddle 150 carries a pivot shaft mounting sleeve 154 that carries pivot shaft 152 with its longitudinal axis coplanar with the longitudinal axis of the telescopic boom segment 16c. The pivot shaft 152 extends beyond the front and rear ends of the mounting sleeve 154. The side angler assembly also comprises linkage mounting bracket 156 that is provided with front and rear pivot shaft journal mountings (only the front journal mounting 158 being shown) mounted on the ends of pivot shaft 152. The linkage mounting bracket is aligned with and mounted to the end of the telescopic boom segment 16c as shown. Consequently, the brush cutter assembly (represented in FIG. 12 by the side plate 92) is rotatable about the axis of pivot shaft 152 and relative to the side angle linkage mounting bracket 156. The degree of rotation is a matter of choice, but 15 to 20 degrees rotation on either side of vertical would ordinarily be sufficient. With respect to the longitudinal extent of the machine's boom assembly 16, the side angler assembly enables the brush cutter assembly to pivot leftward and rightward so that the brush cutter assembly can be tilted with respect to the normal plane of the brush cutter assembly. The side angler assembly further comprises a hydraulic positioning cylinder 160 mounted the linkage bracket 156 and connected to a pivot arm 162. Pivot arm 162 is mounted on saddle 150. By extending and retracting the cylinder 160, the saddle (and the brush cutter assembly mounted thereto) will pivot relative to the fixed position of the linkage mounting bracket 152. Linkage mounting bracket 152 comprises a box frame work with side plates and end blocks, the each end block mounting a journal mounting, such as the mounting 158 shown. The linkage mounting bracket side plates are located above the saddle 150 a sufficient distance to permit the required degree of pivotal movement of the saddle (and its mounted brush cutter assembly) underneath the linkage mounting bracket 156 without interference. The mounting framework 164 for the positioning cylinder 160 extends outward from the linkage mounting bracket 156 and doubles as a protective framework for the cylinder. The mounting of cylinder 160 permits some tilting of the cylinder as would be necessary to accommodate movement of the pivotal connection point with pivot arm 162. The side angler assembly is pivotally mounted to the end of the telescopic boom segment 16c to pivot about axis 166 for pivotal movement in response to the operation of pivot cylinder 32 on the linkage 34. Consequently, by operation on the side angler assembly, the brush cutter assembly can be pivoted upward and downward about the pivot axis 166 and pivoted from side to side about the pivot axis 168. This markedly enhances the versatility of the brush cutter assembly.

While the preferred embodiment of the invention has been described herein, variations in the design may be made. The scope of the invention, therefore, is only to be limited by the claims appended hereto.

The embodiments of the invention in which an exclusive property is claimed are defined as follows:

I claim:

1. A brush cutting machine which comprises turntable means; superstructure means mounting a cab and engine assembly; undercarriage means including forward and rearward pairs of articulating legs mounted for independent articulation; boom means mounted on said superstructure means and comprising a telescopic outer boom arm; and brush cutter means pivotally mounted on the end of said telescopic outer boom arm for pivotal up and down movement on an axis perpendicular to a longitudinal axis of said telescopic outer boom arm.

2. The machine of claim 1 wherein said brush cutter means comprises a cutter blade housing, a circular rotary disk blade rotatably mounted by said housing, a support framework mounting said housing, and connection means pivotally mounting said support framework to the end of said telescopic outer boom arm.

3. The machine of claim 2 wherein said brush cutter means support framework comprises a pair of parallel sideplates mounted atop said housing and extended rearwardly from said housing toward the end of said telescopic outer arm, the rearward edges of said parallel sideplates being configured whereby an excavator cavity is provided therebetween, and an excavator bottom plate mounted between the parallel sideplates adjacent the rearward end of said housing whereby, in combination with said sideplates defining said excavator cavity, an integral rearward-opening excavator bucket is provided.

4. The machine of claim 3 wherein said housing comprises a downwardly-opening inverted pan having a flat top; said parallel sideplates being mounted to said housing top and extended from the front of said housing rearward and beyond the rearward end of said housing to define an excavator bucket extension, the extended portion of said sideplates having bottom edges extended backward from the bottom edge of said housing; and wherein said connection means is mounted to the upper edges of said sideplates at the rearward extension thereof.

5. The machine of claim 4 wherein said brush cutter means comprises an excavator jaw pivotally mounted between the upper rearward ends of said sideplates, and hydraulic cylinder means mounted between said parallel sideplates and said excavator jaw to open and close said jaw relative to the rearward edges of said sideplates.

6. The machine of claim 4 wherein said brush cutter means comprises a thumb mounted between the upper rearward ends of said sideplates and mounted to said boom means whereby said brush cutter means may be pivoted downwardly to bring the rearward edges of said sideplates into a clamping relationship with said thumb.

7. The machine of claim 2 comprises a side-angler assembly connecting the end of said telescopic boom arm to said brush cutter assembly, said assembly including means pivotally mounting said brush cutter means whereby said brush cutter means may be pivoted about an axis that is coplanar with a longitudinal axis of said telescopic boom arm.

8. The machine of claim 7 wherein said brush cutter means support framework comprises a pair of parallel sideplates mounted atop said housing and extended rearwardly from said housing toward the end of said telescopic outer arm, the rearward edges of said parallel sideplates being configured whereby an excavator cavity is provided therebetween, and an excavator bottom plate mounted between the parallel sideplates adjacent the rearward end of said housing whereby, in combination with said sideplates defining said excavator cavity, an integral rearward-opening excavator bucket is provided; said side angler assembly being mounted to the upper rearward extension of said sideplates.

9. The machine of claim 8 wherein said housing comprises a downwardly-opening inverted pan having a flat top; said parallel sideplates being mounted to said housing top and extended from the front of said housing rearward and beyond the rearward end of said housing to define an excavator bucket extension, the extended portion of said sideplates having bottom edges extended backward from the bottom edge of said housing.

10. The machine of claim 9 wherein said brush cutter means comprises an excavator jaw pivotally mounted between the upper rearward ends of said sideplates, and hydraulic cylinder means mounted between said parallel sideplates and said excavator jaw to open and close said jaw relative to the rearward edges of said sideplates.

11. The machine of claim 9 wherein said brush cutter means comprises a thumb mounted between the upper rearward ends of said sideplates and mounted to said boom means whereby said brush cutter means may be pivoted downwardly to bring the rearward edges of said sideplates into a clamping relationship with said thumb.

12. Brush cutter means adapted for attachment to the end of a boom comprising a cutter blade housing, a circular rotary disk blade rotatably mounted by said housing, a support framework mounting said housing, and connection means for pivotally mounting said support framework to a boom means; said brush cutter means support framework comprising a pair of parallel sideplates mounted atop said housing and extended rearwardly from said housing toward the end of said telescopic outer arm, the rearward edges of said parallel sideplates being configured whereby an excavator cavity is provided therebetween, and an excavator bottom plate mounted between the parallel sideplates adjacent the rearward end of said housing whereby, in combination with said sideplates defining said excavator cavity, an integral rearward-opening excavator bucket is provided.

13. The brush cutter means of claim 12 wherein said housing comprises a downwardly-opening inverted pan having a flat top; said parallel sideplates being mounted to said housing top and extended from the front of said housing rearward and beyond the rearward end of said housing to define an excavator bucket extension, the extended portion of said sideplates having bottom edges extended backward from the bottom edge of said housing; and wherein said connection means is mounted to the upper edges of said sideplates at the rearward extension thereof.

14. The brush cutter means of claim 13 wherein said brush cutter means comprises an excavator jaw pivotally mounted between the upper rearward ends of said sideplates, and hydraulic cylinder means mounted between said parallel sideplates and said excavator jaw to open and close said jaw relative to the rearward edges of said sideplates.

15. The brush cutter means of claim 13 wherein said brush cutter means comprises a thumb mounted between the upper rearward ends of said sideplates and mountable to said boom means whereby said brush cutter means may be pivoted downwardly to bring the rearward edges of said sideplates into a clamping relationship with said thumb.

* * * * *